United States Patent
Shih et al.

(10) Patent No.: US 10,007,304 B2
(45) Date of Patent: Jun. 26, 2018

(54) PORTABLE DEVICE AND RELATED VIBRATION DETECTING METHOD

(71) Applicant: MEDIATEK INC., Hsin-Chu (TW)

(72) Inventors: Shuo-Li Shih, New Taipei (TW); Chun-Chia Chen, Hsinchu (TW); Tsu-Ming Liu, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 0 days. days.

(21) Appl. No.: 15/227,977

(22) Filed: Aug. 4, 2016

(65) Prior Publication Data

US 2017/0054463 A1  Feb. 23, 2017

Related U.S. Application Data

(60) Provisional application No. 62/207,469, filed on Aug. 20, 2015.

(51) Int. Cl.
*G06F 1/16* (2006.01)
*G06F 3/043* (2006.01)
*G06F 3/0488* (2013.01)
*H04M 1/725* (2006.01)

(52) U.S. Cl.
CPC .......... *G06F 1/1694* (2013.01); *G06F 3/0433* (2013.01); *G06F 3/04883* (2013.01); *G06F 3/04886* (2013.01); *H04M 1/72569* (2013.01)

(58) Field of Classification Search
CPC .. H04B 1/3833; H04M 1/0266; G06F 3/0433; G06F 3/04883
See application file for complete search history.

(56) References Cited

U.S. PATENT DOCUMENTS

| | | | | |
|---|---|---|---|---|
| 9,179,105 | B1* | 11/2015 | Zeira | H04N 5/2254 |
| 9,575,508 | B2* | 2/2017 | Kasar | G06F 3/017 |
| 2006/0192763 | A1 | 8/2006 | Ziemkowski | |
| 2009/0237233 | A1* | 9/2009 | Smith | H04W 8/30 |
| | | | | 340/539.1 |
| 2013/0176984 | A1* | 7/2013 | Koezuka | H04B 11/00 |
| | | | | 370/329 |
| 2014/0152537 | A1 | 6/2014 | Abdelsamie | |
| 2015/0035683 | A1* | 2/2015 | Hyde | H04Q 9/00 |
| | | | | 340/870.07 |
| 2016/0016186 | A1* | 1/2016 | Hofschulte | B05B 1/306 |
| | | | | 700/283 |
| 2016/0138998 | A1* | 5/2016 | Zheng | G01H 3/08 |
| | | | | 73/579 |

FOREIGN PATENT DOCUMENTS

| CN | 101377549 A | 3/2009 |
|---|---|---|
| CN | 102187647 A | 9/2011 |
| CN | 102436345 A | 5/2012 |

* cited by examiner

*Primary Examiner* — Tuan H Nguyen
(74) *Attorney, Agent, or Firm* — Winston Hsu (57) ABSTRACT

A portable device is utilized to execute a vibration detecting method. The portable device includes a vibration detecting module and a computing unit. The vibration detecting module is adapted to detect a vibration signal. The computing unit is electrically connected to the vibration detecting module and adapted to analyze the vibration signal to acquire a related vibration parameter, so as to actuate an application program of the portable device accordingly.

21 Claims, 8 Drawing Sheets

PORTABLE DEVICE AND RELATED VIBRATION DETECTING METHOD

CROSS REFERENCE TO RELATED APPLICATIONS

This application claims the benefit of U.S. provisional application No. 62/207,469, filed on Aug. 20, 2015. The disclosures of the prior application are incorporated herein by reference herein in their entirety.

BACKGROUND

The present invention relates to a portable device with a related vibration detecting method, and more particularly, to a portable device and a related vibration detecting method.

A conventional portable electronic apparatus utilizes the touch screen to display an image and to receive an input command. While the portable electronic apparatus is handled to change its view angle, the image displayed on the touch screen is automatically rotated in accordance with oriented variation detected by a gyroscope of the portable electronic apparatus; while the portable electronic apparatus is taken from a static condition, an application program may be actuated accordingly via an acceleration detector of the portable electronic apparatus. Therefore, the gyroscope and the acceleration detector are used to detect a simple movement of the portable electronic apparatus, the user cannot utilize the gyroscope and the acceleration detector to input complicated control command the same as the touch screen, and functions of a microphone in the portable electronic apparatus is limited to speaking communication.

SUMMARY

The present invention provides a portable device and a related vibration detecting method for solving above drawbacks.

According to the claimed invention, a portable device includes a vibration detecting module and a computing unit. The vibration detecting module can be, but not limited to, a microphone, an accelerometer and/or a gyroscope. The vibration detecting module is adapted to detect a vibration signal. The computing unit is electrically connected to the vibration detecting module and adapted to analyze the vibration signal to acquire a related vibration parameter, so as to actuate an application program of the portable device accordingly.

According to the claimed invention, a vibration detecting method is applied to the portable device having the vibration detecting module and the computing unit and capable of detecting at least one vibration source surrounding the portable device. The vibration detecting method includes detecting a vibration signal by the vibration detecting module, analyzing the vibration signal to acquire a related vibration parameter by the computing unit, and actuating an application program of the portable device in accordance with the related vibration parameter.

The present invention switches on the vibration detecting module inside the portable device and may be able to provide the multi-input detecting function. The user puts the portable device (such like the mobile phone or the tablet computer) on a traditional desk, a traditional stylus or the finger which is available anywhere is utilized to rub, wipe or click the traditional desk to form the vibration signal and the related vibration parameter, the vibration parameter is interpreted to indicate the trace and/or the rhythm of input gesture and material of the external object (which means determination of the traditional stylus or touching tissue of the finger). A detective region of the portable device can be enlarged by a wide margin in the present invention, the entire desktop can be regarded as the detective region while the portable device is put on any position of the desktop, and the said detective region is in support of single-user operation and multi-user operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
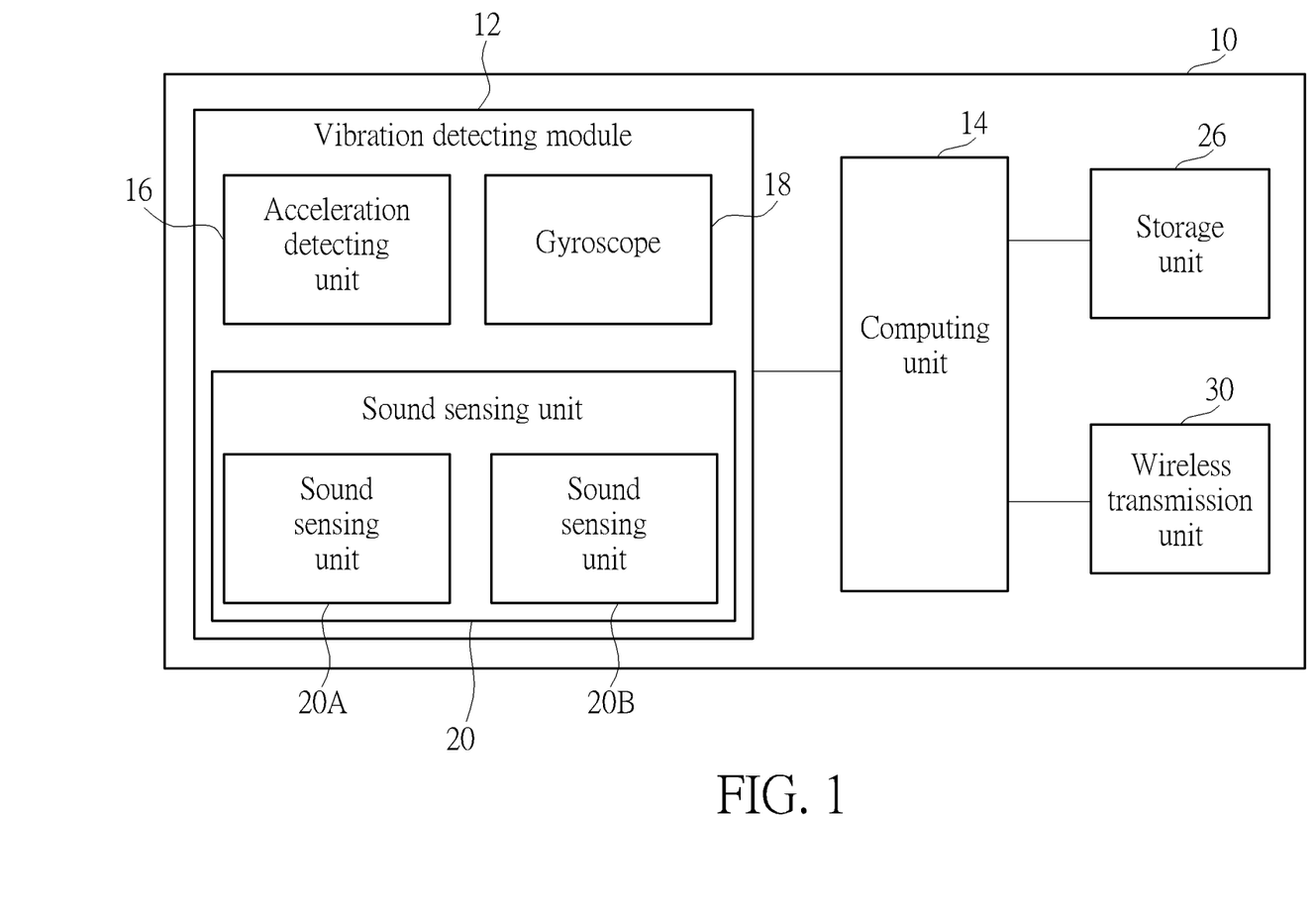
FIG. 1 is a functional block diagram of a portable device according to an embodiment of the present invention.
Figure 2:
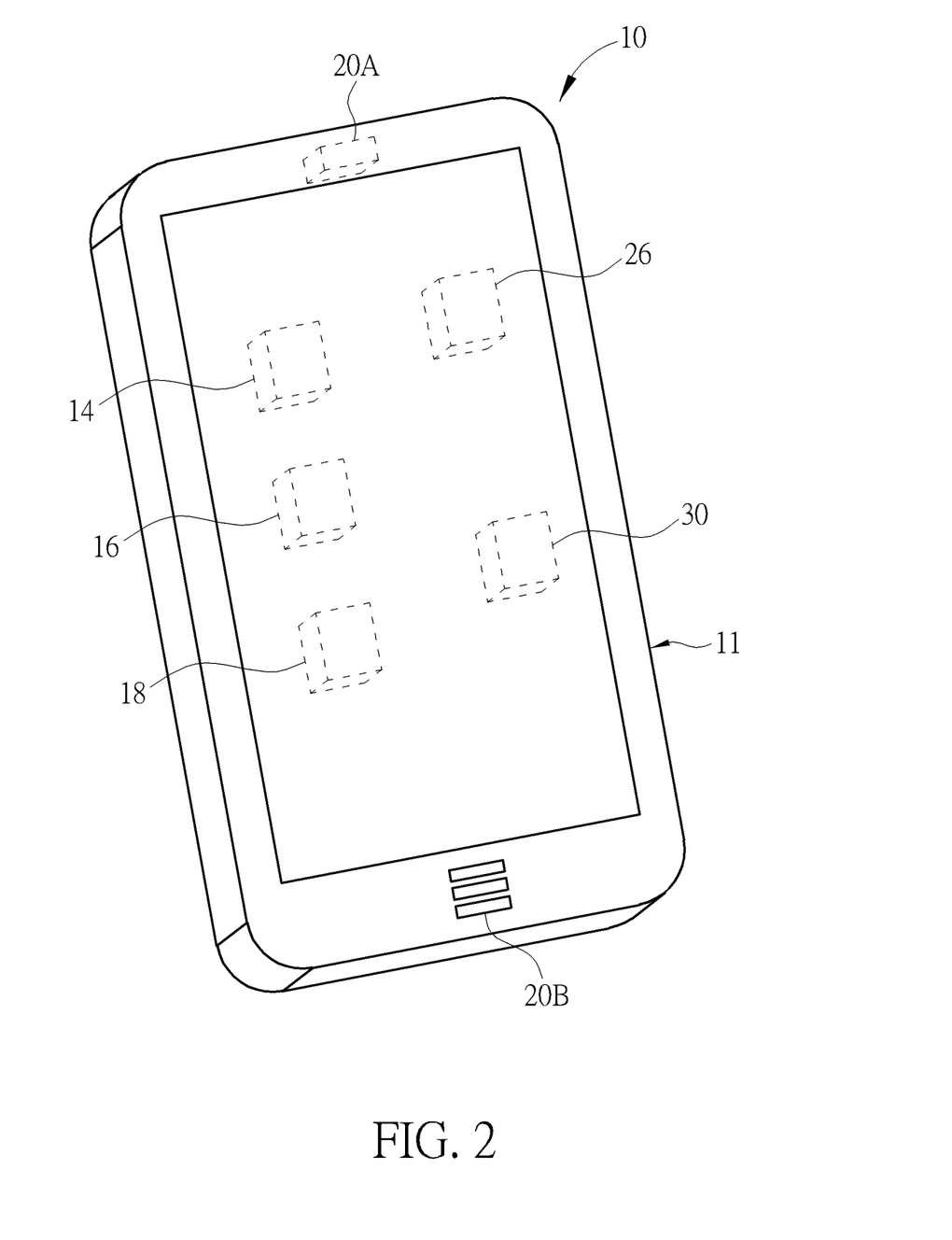
FIG. 2 is a diagram of the portable device according to the embodiment of the present invention.
Figure 8:
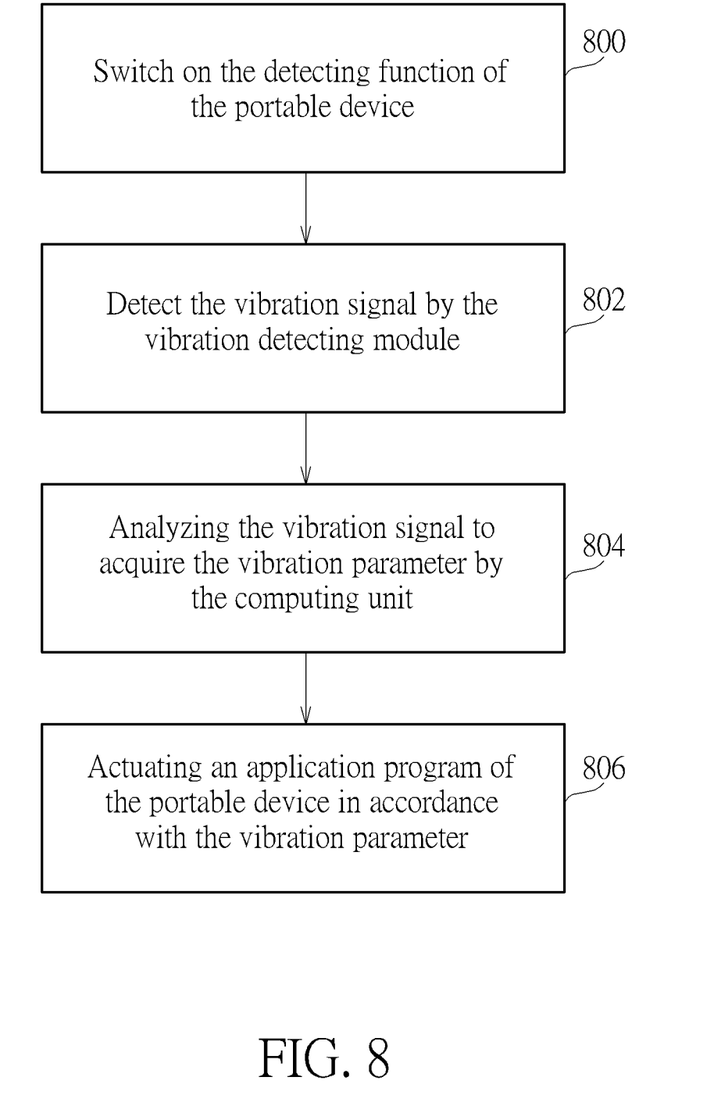
FIG. 8 is a flowchart of a vibration detecting method applied to the portable device according to the embodiment of the present invention.

Please refer to FIG. 1, FIG. 2 and FIG. 8. FIG. 1 is a functional block diagram of a portable device 10 according to an embodiment of the present invention. FIG. 2 is a diagram of the portable device 10 according to the embodiment of the present invention. FIG. 8 is a flow chart of a vibration detecting method applied to the portable device 10 according to the embodiment of the present invention. The portable device 10 includes a vibration detecting module 12 and a computing unit 14 disposed on a circuit board (which is not shown in the figures) and electrically connected with each other. The vibration detecting module 12 can be, but not limited to, a microphone, an accelerometer and/or a gyroscope. The computing unit 14 can be a built-in unit of the portable device 10 or an external unit separated from the portable device 10. The portable device 10 uses the vibration detecting module 12 to detect a surrounding vibration traveling through air or a holder in contact with the portable device 10, the computing unit 14 dissects the surrounding vibration to catch its meaning, so the surrounding vibration source can be applied to input complicated command, and the holder whereon the portable device 10 is put can be defined as an auxiliary touch input interface.

The vibration detecting method illustrated in FIG. 8 may be firstably switching on the detecting function of the portable device 10 (step 800). The vibration detecting module 12 utilizes more than one sound sensing unit to calculate a distance between the surrounding vibration source and the portable device 10, the vibration detecting module 12 may further utilizes several accelerators (such like an acceleration detecting unit and/or a gyroscope) optionally to detect a relative position of the portable device 10 caused by the surrounding vibration source, so the detecting function switched in step 800 is provided by the vibration detecting module 12, and the computing unit 14 reads and analyzes information from the vibration detecting module 12. While an external object is vibrated distant from the portable device 10, vibration of the external object is transmitted toward the portable device 10 via a medium (which can be made of solid matter, gaseous matter or liquid matter) and then detected by the vibration detecting module 12 (step 802), and the computing unit 14 analyzes a vibration signal received by the vibration detecting module 12 to acquire a related vibration parameter (step 804). Information of the vibration signal, such as the amplitude, the waveform, the wavelength and the frequency, is used to represent property of the related vibration parameter and the surrounding vibration source, so the related vibration parameter can be used to decide behavior of the external object, and an application program of the portable device 10 is actuated in accordance with the foresaid behavior (step 806).

The vibration detecting module 12 has interior components selected from a group consisting of an acceleration detecting unit 16, a gyroscope 18 and at least one sound sensing unit. The acceleration detecting unit 16 and the gyroscope 18 are utilized to detect acceleration information and direction information caused by the vibration signal. The portable device 10 is vibrated while the vibration is transmitted through a working surface whereon the portable device 10 is located, such that the acceleration detecting unit 16 may detect own acceleration variation of the portable device 10, and the gyroscope 18 may detect locality of the surrounding vibration source by conservation of angular momentum. In one embodiment, since the vibration detecting module 12 has the single sound sensing unit, the said sound sensing unit can be utilized to detect frequency and waveform of the vibration. In another embodiment, Since the vibration detecting module 12 has at least two sound sensing units, such as the sound sensing units 20A and 20B, the foresaid sound sensing units can be utilized to detect the distance between the surrounding vibration source and the portable device 10.

The sound sensing units 20A and 20B are respectively fixed at specific positions upon a housing of the portable device 10; for instance, the sound sensing unit 20 may be disposed on a front surface and the sound sensing unit 20B may be disposed on a back surface of the portable device 10, or the sound sensing unit 20A can be disposed on an upper region and the sound sensing unit 20B can be disposed on a lower region of the portable device 10. The sound sensing units 20A and 20B are utilized to respectively receive a sound signal in accordance with the vibration signal because the vibration signal is transmitted from the external object toward the portable device 10 via the air and/or the working surface (such as the tabletop) whereon the external object is located, which means the sound sensing units 20A and 20B are acted on detection of acoustic wave vibration. The sound sensing units can be replaced by vibration sensors instead.

As shown in FIG. 1 and FIG. 2, the portable device 10 may have a casing 11, and the vibration detecting module 12 may be fixed inside the casing 11 or may be put neighboring to the casing 11. Therefore, while the portable device 10 is put on the working surface, the casing 11 directly contacts the working surface, the vibration transmitted through the working surface can affect the casing 11, and then the vibration around the casing 11 can be sensed by the vibration detecting module 12.

Figure 3:
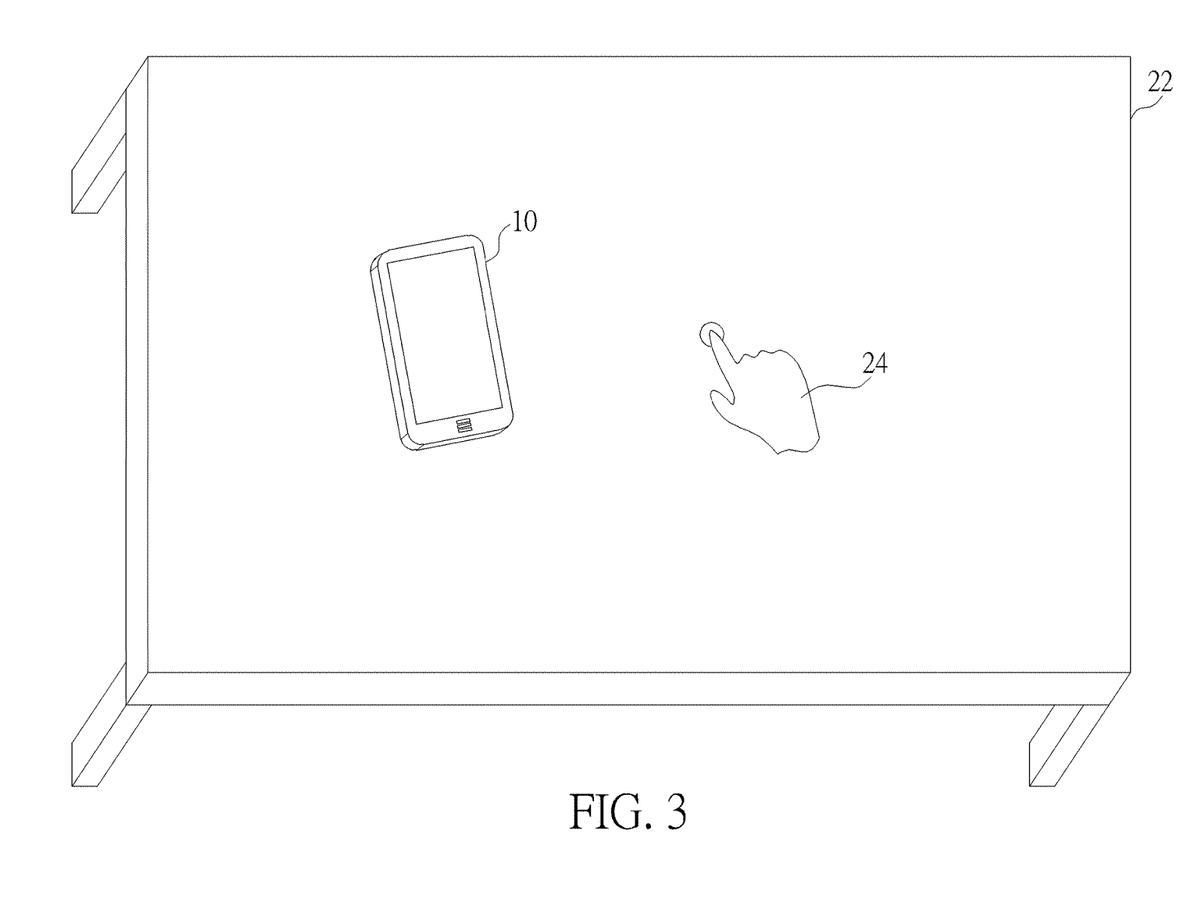
FIG. 3 is an application diagram of the portable device according to a first embodiment of the present invention.

Please refer to FIG. 3. FIG. 3 is an application diagram of the portable device 10 according to a first embodiment of the present invention. In the first embodiment, the portable device 10 is put on the working surface 22 and the detecting function is actuated. While the external object 24 contacts against a region of the working surface 22 distant from the portable device 10, the vibration signal is generated by impact of the external object 24 touching the working surface 22, one of the sound sensing units (such like the sound sensing unit 20A) senses the sound signal through the air, and the other sound sensing unit (such like the sound sensing unit 20B) senses the sound signal through the working surface 22, so the computing unit 14 can time difference between first sensed moments of the sound signal respectively traveling among the air and the working surface 22 and being sensed by the sound sensing units 20A and 20B.

In the first embodiment, at least one of the sound sensing units 20A and 20B is an indispensable component of the vibration detecting module 12, the acceleration detecting unit 16 and the gyroscope 18 may be optional accordingly. Any component capable of determining acceleration belongs to a scope of the vibration detecting module 12, and a detailed description is omitted herein for simplicity.

The portable device 10 can further include a storage unit 26 electrically connected to the computing unit 14. The storage unit 26 is utilized to store the foresaid application program and material information of the working surface 22, thus a propagation velocity Vt of the sound signal traveling through the working surface 22 is available by searching the lookup table stored in the storage unit 26, and a propagation velocity Va of the sound signal traveling through the air is also a known parameter. Then, a distance between the external object 24 and the portable device 10 is assumed as a symbol D, the receiving duration of the sound sensing unit 20A is defined as a symbol Ta (which equals a value of the distance D divided by the propagation velocity Va), the receiving duration of the sound sensing unit 20B is defined as a symbol Tt (which equals a value of the distance D divided by the propagation velocity Vt), the receiving duration Ta is subtracted from the receiving duration Tt to have the time difference dt, and finally the computing unit 14 can analyze the foresaid received data to calculate the distance D in accordance with the following formula 1.

$$D = \frac{dt}{\frac{1}{Vt} - \frac{1}{Va}} \qquad \text{(Formula 1)}$$

The storage unit 26 can optionally store a correction program applied to correct the propagation velocity Vt of the sound signal traveling through the working surface 22. For example, material property of the working surface 22 may be changed due to many factors (such as temperature and/or humidity variation (which affects an actual value of the propagation velocity Vt), or an article (such like writing tools) putting on the working surface 22) and may result in alteration of the propagation velocity Vt, so that the correction program can analyze a hit generated at a predetermined timing or a hit located within a predetermined region on the working surface 22 for correction of the propagation velocity Vt. The foresaid hit is preferably operated by the user via a tool with the known material information. Moreover, the above-mentioned receiving duration is starting from a first timing when the sound signal is generated to a second timing when the sound sensing unit 20 senses the sound signal.

In addition, a relative position of the external object 24 in relation to the portable device 10 can be determined via the time difference of the received data. The sound sensing units 20A and 20B respectively detect the sound signal traveling through the air and the working surface 22, so that the sound sensing unit 20A receives the larger amplitude of vibration while the external object 24 is close to the upper region of the portable device 10, or the sound sensing unit 20B receives the larger amplitude of vibration while the external object 24 is close to the lower region of the portable device 10. Then, the computing unit 14 analyzes locational relation between the external object 24 and the sound sensing units 20A and 20B to determine the relative position of the external object 24 relative to the portable device 10. Moreover, the time difference between receiving moments of the sound signal respectively traveling among the air and the working surface 22 and being received by the sound sensing units 20A and 20B can be further applied to calculate the said relative position.

The working surface 22 is a surface to contact with the portable device 10 and is larger than a touch screen of the portable device 10 in dimensions. For example, if the portable device 10 is put on a desktop, the desktop can be taken as the working surface 22. In some other embodiments, the working surface 22 can be any other type of surface to contact with the portable device 10, which should not be limited in this disclosure. In one embodiment of this invention, the external object 24 can be a finger of the user, and the portable device 10 may utilize the vibration detecting module 12 to detect the finger's movement upon the working surface 22, whereon the portable device 10 is located. The portable device 10 acquires the vibration parameter (such like the relative position and location of the finger) by detection, the related vibration parameter can be transformed into a trace of the finger sliding upon the working surface, and the trace can be interpreted as a symbol, a numeral, a character and/or a print drafted by the user. It is to say, the portable device 10 can be switched into a hand-writing mode and utilize the vibration detecting module 12 to achieve writing input functionality, and then the application program is actuated accordingly.

A pre-defined rhythm may be stored in the storage unit 26 of the portable device 10. While the user clicks or rubs against the working surface 22, the computing unit 14 analyzes the sensed rhythm generated by the external object 24 hitting the working surface 22. In some embodiments, the received rhythm may be a password to be compared with the pre-defined rhythm, and the sensed rhythm can be authorized while difference between the sensed rhythm and the pre-defined rhythm is lower than a preset tolerance. The touch screen of the portable device 10 can be locked or unlocked according to the comparison result, or the specific application program of the portable device 10 can be actuated in accordance with the comparison result for hard identification and/or soft identification. For example, the pre-defined rhythm can be generated by rubbing or clicking at a pre-defined time and/or a pre-defined tempo against the working surface 22, or be generated by rubbing or clicking at a pre-defined tempo and a pre-defined series of position against the working surface 22. For the hard identification, the computing unit 14 utilizes a password in the form of the sensed rhythm rubbed against the working surface 22 to recognize the user's I.D., so as to lock/unlock the portable device 10 or to execute a specific identification of the portable device 10. For the soft identification, the user's I.D. is recognized at a background mode of the portable device 10; when the user continuously rubs or clicks against the working surface 22 and inputs the rhythm to the portable device 10, the computing unit 14 analyzes the rubbing/clicking style and tempo of the sensed rhythm at the same time, and the user's I.D. can be recognized in a while (such as one minute) accordingly.

Figure 4:
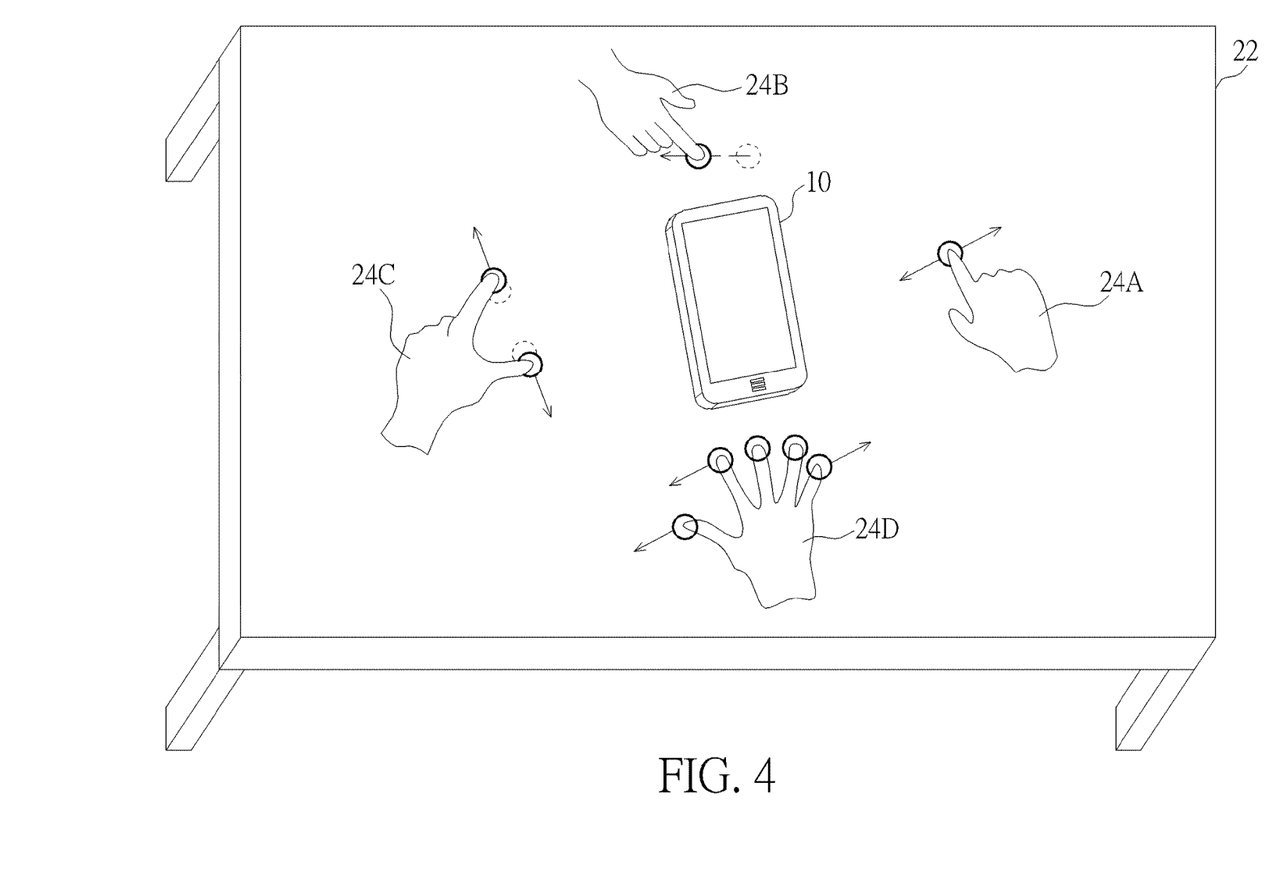
FIG. 4 is an application diagram of the portable device according to a second embodiment of the present invention.

Please refer to FIG. 1 and FIG. 4. FIG. 4 is an application diagram of the portable device 10 according to a second embodiment of the present invention. The vibration detecting module 12 may detect a plurality of vibration signals resulted by different objects 24A, 24B, 24C and 24D, and the computing unit 14 analyzes relative positions of the plurality of vibration signals to determine a quantity of the whole objects 24A, 24B, 24C and 24D; for example, the carrier wave within the vibration signal is helpful to recognize how many external objects applied to the working surface 22. Furthermore, the vibration detecting module 12 may detect vibration signals resulted by the external object 24A (or the external object 24B for single-input identification), or detect the vibration signals resulted by several spots of the external object 24C (or the external object 24D for multi-input identification), and the computing unit 14 analyzes the rhythm of the plurality of vibration signals and the trace of the foresaid external objects for actuating and driving the related application program.

Figure 5:
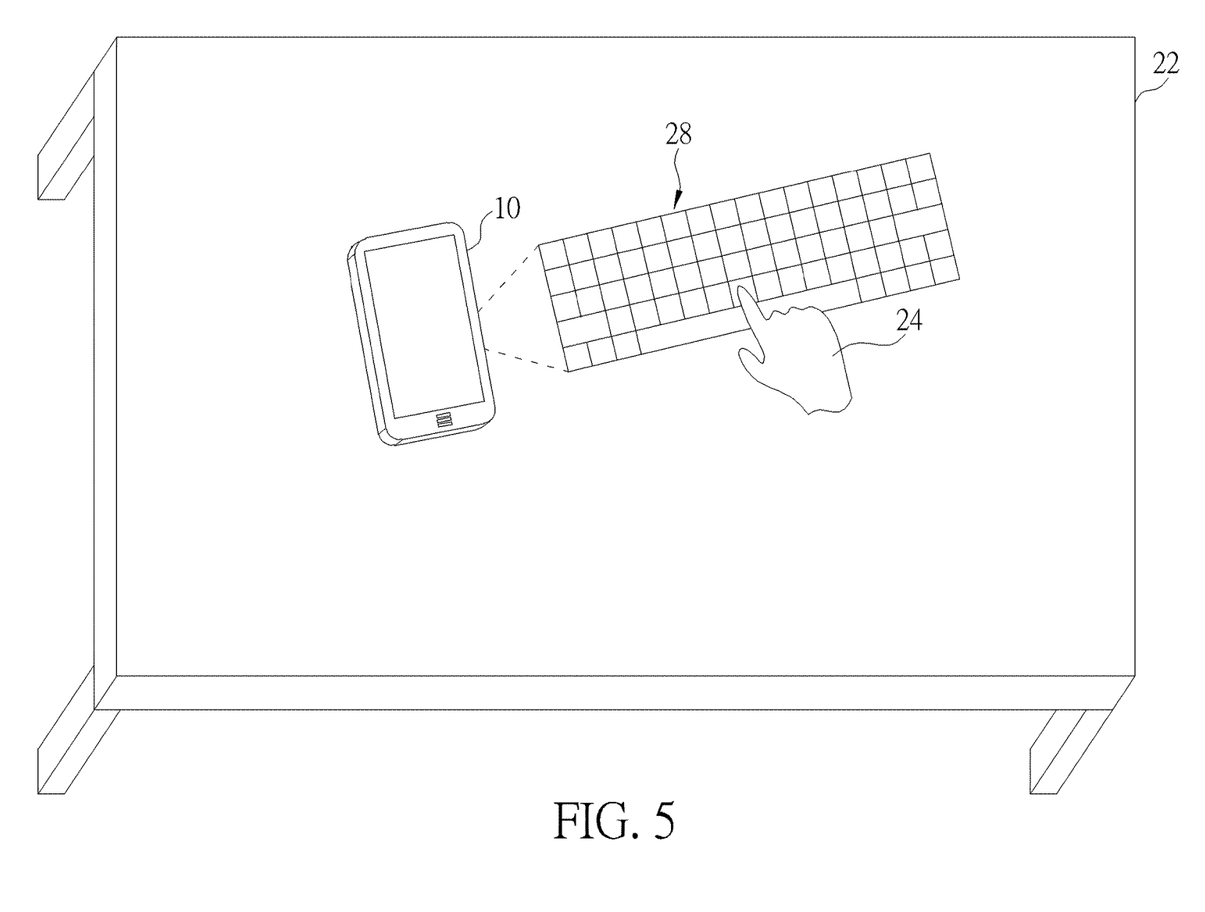
FIG. 5 is an application diagram of the portable device according to a third embodiment of the present invention.

In another possible application, the portable device 10 may project a keyboard pattern on the working surface 22 by a built-in projector, or the keyboard pattern is pre-set on the working surface 22 adjacent to the portable device 10. Please refer to FIG. 1 and FIG. 5. FIG. 5 is an application diagram of the portable device 10 according to a third embodiment of the present invention. The keyboard pattern 28 includes a plurality of virtual icons, such as keyswitches similar to the physical keyboard; however the virtual icon may be designed as an individual button, which depends on actual demand. Because the portable device 10 has ability to determine the relative position and the related distance of the external object 24, the computing unit 14 can be used to further find out which virtual icon is triggered by the external object 24, so that the keyboard pattern 28 can be an auxiliary input interface matched with the touch screen of the portable device 10. For instance, the virtual icon is triggered to validate or to invalidate a specific function by clicking. In the third embodiment, the vibration detecting module 12 may include the acceleration detecting unit 16 and the sound sensing units 20A and 20B, and optionally include the gyroscope 18.

In another possible application, while the portable device 10 is put on the working surface 22 without impact of the external object 24, the vibration detecting module 12 may be utilized to detect the vibration signal generated from surrounding shake, such as the earthquake or unauthorized behavior, and the computing unit 14 is able to output the earthquake warning or the anti-theft warning for reminder. Vibration of the earthquake and vibration resulted by a movement of surrounding furniture are transmitted from the ground to the working surface 22, the vibration resulted in a movement of the portable device 10 directly activates the vibration detecting module 12, and the portable device 10 analyzes and transforms the vibration parameter into the earthquake alarm and/or the burglar alarm.

In another possible application, material information of the external object 24 may be pre-stored in the storage unit 26. The external object 24 can be the stylus, the key, the finger pulp, the finger dorsum or the fingernail. The vibration detecting module 12 detects the vibration signal generated by the external object 24 contacting against the working surface 22, the computing unit 14 classifies property of the related vibration parameter in accordance with the waveform, the wavelength and the frequency of the vibration signal, and, accordingly, material of the external object 24 and/or relative position of the external object 24 relative to the portable device 10 can be recognized.

Figure 6:
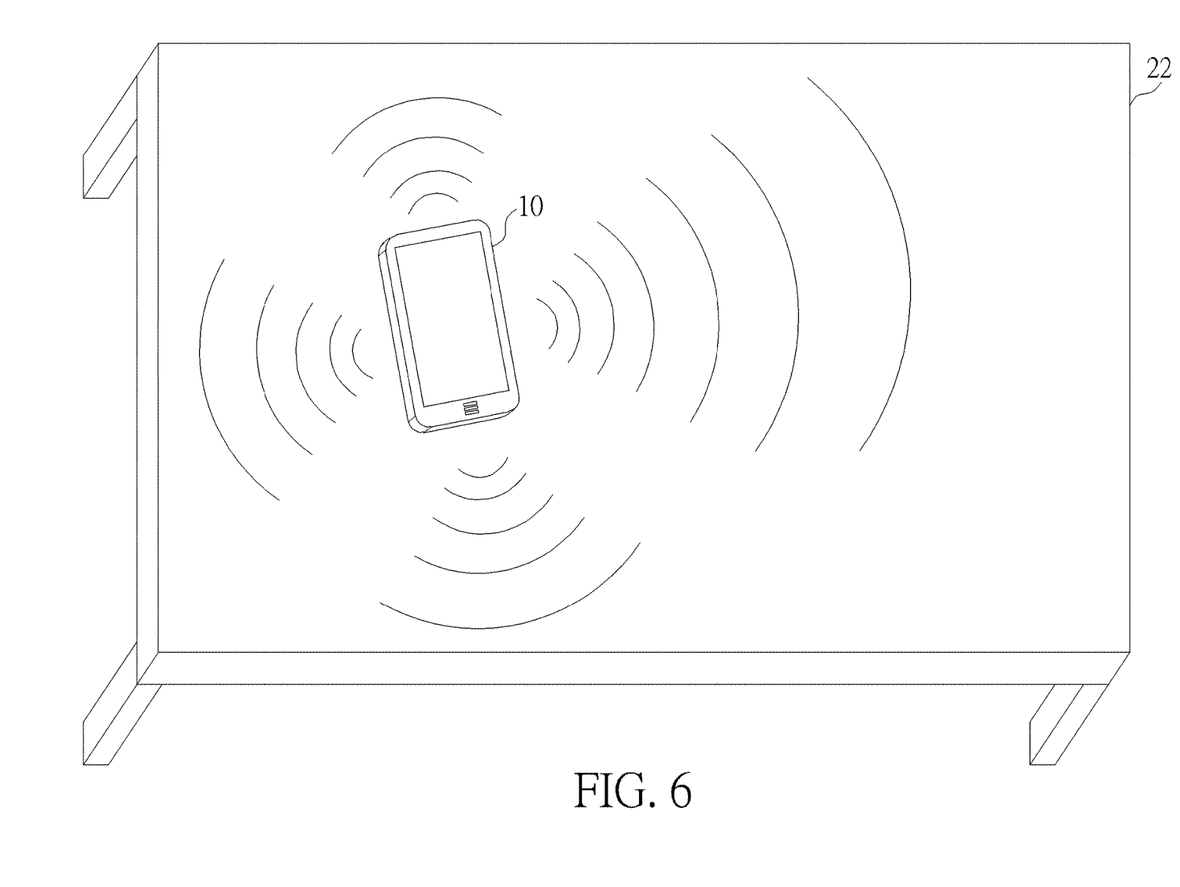
FIG. 6 is an application diagram of the portable device according to a fourth embodiment of the present invention.

Please refer to FIG. 1 and FIG. 6. FIG. 6 is an application diagram of the portable device 10 according to a fourth embodiment of the present invention. In the moment of dropping the portable device 10 onto the working surface 22, the vibration signal is generated from the impact that the portable device 10 hits the working surface and the vibration may be transmitted along the working surface 22 outwardly, a rebound signal is resulted by the vibration signal reflected from an edge of the working surface 22, and then the vibration detecting module 12 may be able to detect the rebound signal and the computing unit 14 analyzes the rebound signal to determine dimensions of the working surface 22. In other words, in the fourth embodiment, the vibration detecting module 12 may utilize the gyroscope 18 and/or the sound sensing units 20A and 20B to detect and acquire the dimensions of the working surface 22.

Figure 7:
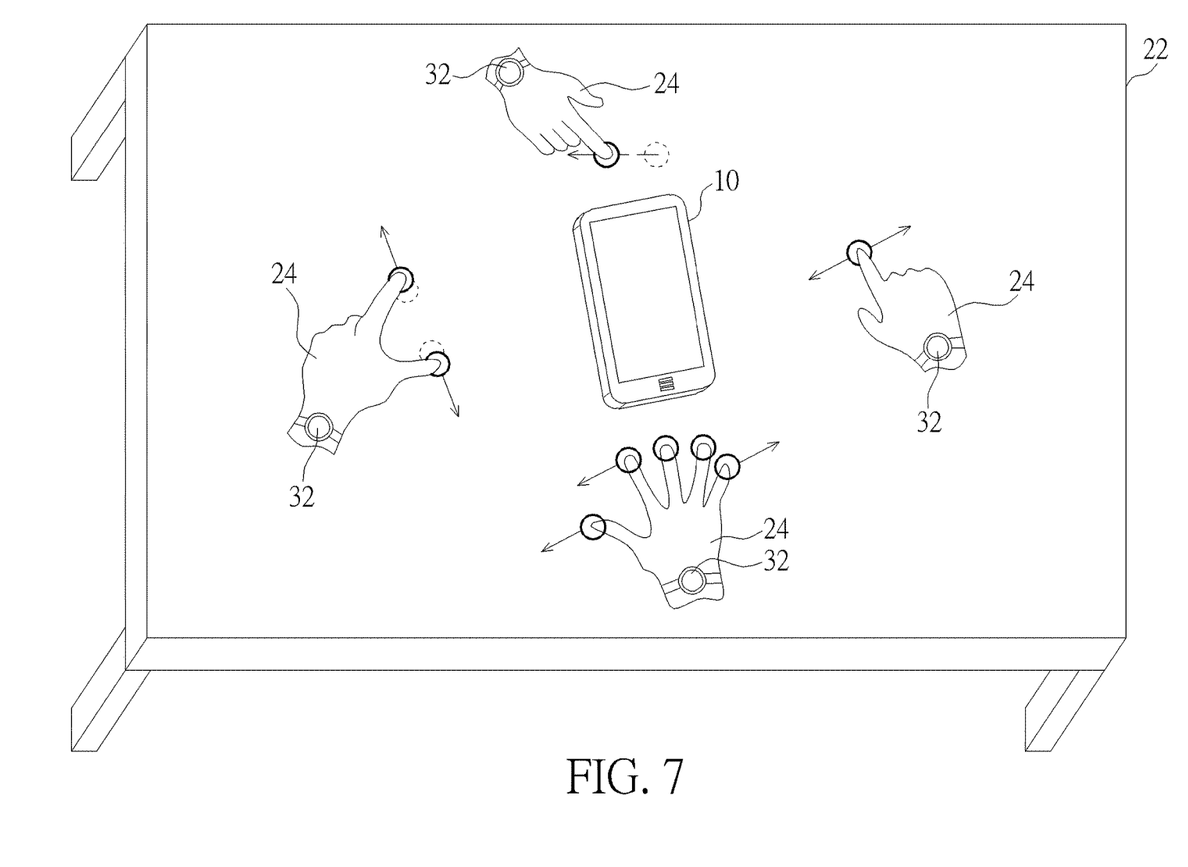
FIG. 7 is an application diagram of the portable device according to a fifth embodiment of the present invention.

Please refer to FIG. 1 and FIG. 7. FIG. 7 is an application diagram of the portable device 10 according to a fifth embodiment of the present invention. The portable device 10 may include a wireless transmission unit 30 electrically connected to the computing unit 14 for communicating with at least one external electronic apparatus 32. The wireless transmission unit 30 is Bluetooth communication unit, WiFi communication unit or any other communication unit applying any wireless communication protocol. The external electronic apparatus 32 can be a smart watch worn on the user's wrist (which is defined as the external object 24), the external electronic apparatus 32 outputs a control command (such like the on-line request) for identity recognition, the wireless transmission unit 30 receives the control command and the computing unit 14 identifies the specially designated external object 24 from the whole objects. Besides, the external electronic apparatus 32 may be designed as the portable device with the vibration detecting module including the acceleration detecting unit, the gyroscope and/or the sound sensing units.

According to the above-mentioned embodiments, the present invention may switch on the vibration detecting module among the portable device to provide the detecting function. The user puts the portable device (such like the mobile phone or the tablet computer) on a traditional desk, then, a traditional stylus, the finger or any other object which is available anywhere is utilized to rub, wipe or click the traditional desk to form the vibration signal and the related vibration parameter, the vibration parameter is interpreted to indicate the trace and/or the rhythm of input gesture and material of the external object (which means determination of the traditional stylus or touching tissue of the finger). A detective region of the portable device can be enlarged by a wide margin in the present invention, the entire desktop can be regarded as the detective region while the portable device is put on any position of the desktop, and the said detective region is in support of single-user operation and multi-user operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable device capable of being put on a working surface, the portable device comprising:
    a vibration detecting module adapted to detect a vibration signal transmitted from the working surface and generated by an object as a vibration source; and
    a computing unit adapted to analyze the vibration signal to acquire a related vibration parameter and to determine direction information and distance information of the vibration source impacting the working surface whereon the portable device is positioned, so as to actuate an application program of the portable device accordingly.

2. The portable device of claim 1, wherein the vibration detecting module comprises at least two sound sensing units fixed at specific positions and adapted to respectively sense a sound signal caused by the vibration signal.

3. The portable device of claim 2, wherein the sound sensing units are acted on detection of acoustic wave vibration.

4. The portable device of claim 2, wherein one of the sound sensing units receives the sound signal through air, and the other sound sensing unit receives the sound signal through the working surface whereon the portable device is located.

5. The portable device of claim 4, wherein the vibration signal is generated by the object contacting against the working surface, and the computing unit analyzes received data of the at least two sound sensing units to calculate a distance between the object and the portable device via time difference of the received data.

6. The portable device of claim 5, wherein the distance is calculated by a propagation velocity of the sound signal traveling through the air, a propagation velocity of the sound signal traveling through the working surface, and the time difference of the received data.

7. The portable device of claim 5, wherein there are a plurality of blocks on the working surface adjacent to the portable device, each of the blocks corresponds to at least one of a plurality of virtual icons, and the computing unit determines which virtual icon is triggered by the object in accordance with the distance between the object and the portable device.

8. The portable device of claim 5, wherein the related vibration parameter is transformed into a trace of the object sliding upon the working surface in accordance with calculation of the foresaid distance, and the computing unit identifies the trace to determine whether or how the application program is actuated.

9. The portable device of claim 2, wherein the computing unit determines a relative position of the object in relation to the portable device via time difference of the received data.

10. The portable device of claim 1, wherein the vibration detecting module comprises an acceleration detecting unit adapted to detect acceleration information caused by the vibration signal.

11. The portable device of claim 1, wherein the vibration detecting module comprises a gyroscope adapted to detect direction information caused by the vibration signal.

12. The portable device of claim 1, wherein the vibration signal is generated by surrounding shake transmitted via the working surface whereon the portable device is located, and the related vibration parameter is represented as earthquake alarm or burglar alarm.

13. The portable device of claim 1, wherein the vibration signal is generated by the object contacting against the working surface whereon the portable device is located, and the related vibration parameter is represented as at least one of material of the object and a relative position of the object relative to the portable device.

14. The portable device of claim 13, wherein the vibration detecting module detects a rebound signal resulted by the vibration signal reflected from an edge of the working surface, and the computing unit analyzes the rebound signal to determine dimensions of the working surface.

15. The portable device of claim 1, further comprising:
a storage unit electrically connected to the computing unit, and adapted to store the application program and material information of the object and the working surface whereon the portable device is located.

16. The portable device of claim 1, further comprising:
a wireless transmission unit electrically connected to the computing unit and adapted to receive a control command of an external electronic apparatus, the computing unit utilizing the control command to identify the object whereon the external electronic apparatus is disposed.

17. The portable device of claim 1, wherein the vibration detecting module is utilized to detect a plurality of vibration signals resulted by the object, and the computing unit analyzes rhythm of the plurality of vibration signals for identification.

18. The portable device of claim 1, wherein the vibration detecting module is utilized to detect a plurality of vibration signals resulted by different objects, and the computing unit analyzes a relative position of the plurality of vibration signals to determine a quantity of the different objects.

19. The portable device of claim 1, further comprising:
a casing, wherein the vibration signal is sensed around the casing.

20. A vibration detecting method applied to a portable device having a vibration detecting module and a computing unit and capable of being put on a working surface and detecting at least one vibration source surrounding the portable device, the vibration detecting method comprising:
detecting a vibration signal generated by an object as a vibration source and transmitted from the working surface by the vibration detecting module;
analyzing the vibration signal to acquire a related vibration parameter and to determine direction information and distance information of the vibration source impacting the working surface whereon the portable device is positioned by the computing unit; and
actuating an application program of the portable device in accordance with the related vibration parameter.

21. A portable device comprising:
a vibration detecting module adapted to detect a vibration signal; and
a computing unit adapted to analyze the vibration signal to acquire a related vibration parameter, so as to actuate an application program of the portable device accordingly, wherein the vibration signal is generated by an object contacting against a working surface whereon the portable device is located, and the related vibration parameter is represented as at least one of material of the object and a relative position of the object relative to the portable device.

* * * * *